(12) United States Patent
Henderson

(10) Patent No.: US 8,504,692 B1
(45) Date of Patent: *Aug. 6, 2013

(54) BROWSER BASED REDIRECTION OF BROKEN LINKS

(75) Inventor: Philip Thomas Henderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,829

(22) Filed: Sep. 26, 2011

(51) Int. Cl.
*G06F 15/173* (2006.01)
*G06F 15/16* (2006.01)

(52) U.S. Cl.
USPC ............................ 709/226; 709/219; 709/239

(58) Field of Classification Search
None
See application file for complete search history.

(56) References Cited

U.S. PATENT DOCUMENTS

| | | | |
|---|---|---|---|
| 6,678,717 B1 * | 1/2004 | Schneider | 709/203 |
| 7,110,399 B2 * | 9/2006 | Banerjee et al. | 370/389 |
| 7,954,144 B1 | 5/2011 | Ebrahimi et al. | |
| 2002/0046281 A1 | 4/2002 | Cope | |
| 2002/0116411 A1 | 8/2002 | Peters et al. | |
| 2006/0265714 A1 | 11/2006 | Bissett et al. | |
| 2007/0033264 A1 * | 2/2007 | Edge et al. | 709/217 |
| 2007/0038765 A1 * | 2/2007 | Dunn | 709/229 |
| 2007/0067489 A1 * | 3/2007 | Blank et al. | 709/238 |
| 2008/0263049 A1 | 10/2008 | Hind et al. | |
| 2010/0042743 A1 * | 2/2010 | Jeon et al. | 709/238 |
| 2011/0060812 A1 * | 3/2011 | Middleton | 709/219 |
| 2011/0231555 A1 | 9/2011 | Ebrahimi et al. | |

OTHER PUBLICATIONS

The Non-Final Rejection mailed on Nov. 22, 2011 in the prosecution of U.S. Appl. No. 13/245,818, filed Sep. 26, 2011, 7 pages.
The Reply filed Feb. 22, 2012 in the prosecution of U.S. Appl. No. 13/245,818, 9 pages.
The Final Rejection mailed May 4, 2012 in the prosecution of U.S. Appl. No. 13/245,818, 7 pages.
The Amendment and Reply filed Jul. 5, 2012 in the prosecution of U.S. Appl. No. 13/245,818, 16 pages.
The Non-final Rejection mailed Sep. 20, 2012 in the prosecution of U.S. Appl. No. 13/245,818, 7 pages.
The Reply filed Oct. 10, 2012 in the prosecution of U.S. Appl. No. 13/245,818, 7 pages.
The Notice of Allowance mailed Oct. 31, 2012 in the prosecution of U.S. Appl. No. 13/245,818, 7 pages.

* cited by examiner

*Primary Examiner* — John B. Walsh
(74) *Attorney, Agent, or Firm* — Sterne, Kessler, Goldstein & Fox, P.L.L.C.

(57) ABSTRACT

Disclosed herein are methods, systems, and computer readable media for providing correct identifiers for web pages to users. A redirect database with original identifiers and redirected identifiers found to be associated with the original identifiers may be established. A processing device may transmit a first request for a resource located at a location specified by an identifier. The processing device may determine that the resource is no longer located at the location, and may receive a redirected identifier for the resource. The processing device may then transmit a second request for the resource to a location specified by the redirected identifier.

17 Claims, 6 Drawing Sheets

BROWSER BASED REDIRECTION OF BROKEN LINKS

BACKGROUND

The Internet provides access to a wide range of resources. For example, web pages for particular subjects are accessible over the Internet. These resources may be retrieved and viewed by users by typing in an identifier (e.g., a URL) or by clicking a link for the location of the resource. These identifiers may change, and users may be unable to reach a desired resource if the desired resource is no longer located at the location specified by the identifier.

BRIEF SUMMARY

Embodiments described below include methods, systems, and computer program products for providing easier redirection of broken links. A method in accordance with an embodiment includes transmitting a first request for a resource. The location of the resource is specified by an identifier. A processing device determines that the resource is no longer located at the location specified by the identifier. A redirected identifier is received from a database. A second request for the resource is transmitted to a location specified by the redirected identifier.

A system, in accordance with an embodiment, includes a processor. The system also includes a web browser, implemented on the processor. The web browser is configured to transmit a first request for a resource. The location of the resource is specified by an identifier. The web browser is further configured to determine that the resource is no longer located at the location specified by the identifier. The web browser is configured to receive a redirected identifier for the resource from a database. The web browser is further configured to transmit a second request for the resource to a location specified by the redirected identifier.

A method in accordance with another embodiment includes retrieving a resource by a processing device, where the location of the resource is specified by an identifier. The processing device determines that a redirected identifier exists for the resource, and denotes that the redirected identifier is associated with the identifier used to retrieve the resource. A request for the redirected identifier associated with the identifier is received, and the redirected identifier is transmitted in response to the request.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Figure 1:
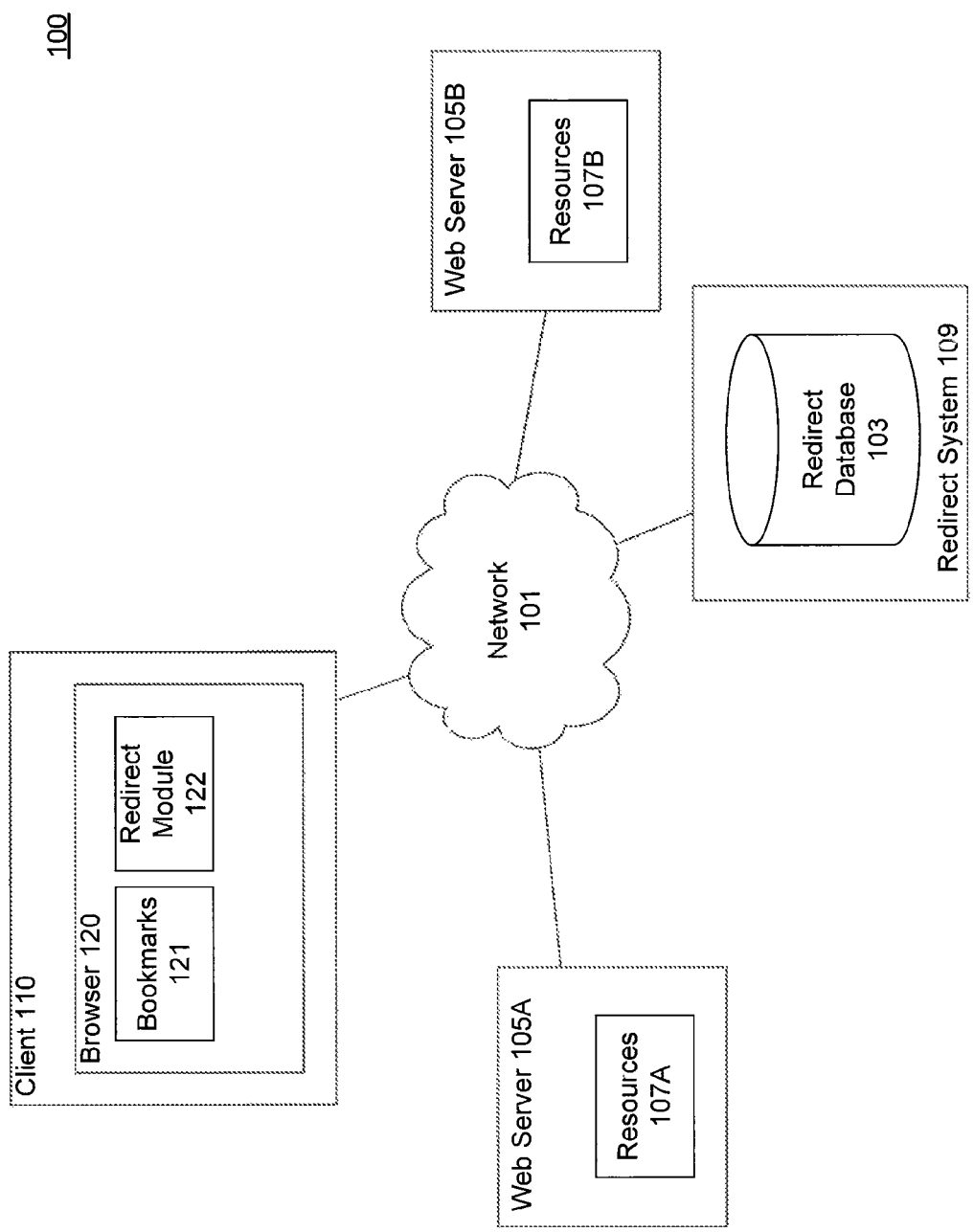
FIG. 1 illustrates an environment in which embodiments may be implemented.

FIG. 1 is an illustration of an example environment 100 in which embodiments may be implemented. Environment 100 includes client 110, web server 105A, web server 105B, redirect system 109, and redirect database 103. The systems of environment 100 are connected via network 101, which may be a local area network or wide area network such as the Internet. Connections between the various systems of environment 100 and network 101 may be wired or wireless connections.

Client 110 may be, for example and without limitation, a device such as a desktop computer, laptop computer, mobile device, tablet computer, set top box, or other computing device configured to access resources through a network. Client 110 includes browser 120, which may be an application executed by a processing device of client 110. Browser 120 is configured to request and retrieve resources, such as web pages or web sites, over network 101. Browser 120 includes bookmarks 121, which may be input by a user and stored on client 110, or accessed via network 101. Each bookmark may include a descriptive title and a link to an identifier such as a web address or Uniform Resource Locator (URL) to provide easy access to a resource for a user. Browser 120 further includes redirect module 122, the operation of which is further described herein.

Web servers 105A and 105B may be any computing device configured to accept requests for resources and provide resources in response to the requests. Web servers 105 may be implemented on a computing device or a group of computing devices. Further, web servers 105 may be implemented on a distributed computing system.

Environment 100 further includes redirect system 109 and redirect database 103. In one embodiment, redirect database 103 may be implemented in redirect system 109. In another embodiment, redirect database 103 may be connected to or coupled to redirect system 109, for example, via network 101.

Redirect database 103 stores one or more elements of data specifying an original identifier and associated redirected identifier for one or more resources. Redirect database 103 may be implemented in any type of persistent memory. Further, redirect database 103 may be any type of relational or non-relational database.

A user requesting a resource from a web server 105 may input an identifier for the location of the resource, such as a URL. For example, the user may have a bookmark with a URL for a resource such as a news article web page located at http://www.identifier1.com/today/news_article.html. The user may request this resource once or may request the resource periodically. The browser may use the identifier to communicate with a web server, such as web server 105A, corresponding to the identifier, to retrieve the resource.

At some point, the party controlling the news page may change the identifier for the news page. For example, the identifier may change to http://www.identifier2.com/today/news_article.html. The identifier may also change to, for example, http://www.identifier1.com/01/01/2011/news_article.html. In the first situation, the change in identifier may indicate that the news page is no longer located at web server 105A, and is instead located at web server 105B. In the second situation, the change in identifier may indicate that the news page is still located at web server 105A, but the location of the news page within web server 105A has changed.

For a certain period of time, the publisher of the resource may provide an indication at the location specified by the original identifier that the website will no longer be available at the old identifier, and that users should locate the resource at the new identifier. Such an indication may be provided by a web page, or may be provided in an HTTP response, as will be further explained herein. However, after this period of time passes, if the user tries to retrieve the resource using the old identifier, she may receive an error and may not be able to reach the requested resource and content. An identifier that no longer reaches its intended resource may be known as a broken link.

The user may have a number of options to attempt to reach the requested content when faced with a broken link. The user may attempt to receive a cached version of the web page to see if the cached version contains an indication that the resource has changed identifiers. However, many users are unfamiliar with the concept of cached versions of web pages, and/or may find the cached versions difficult to locate.

The user may also use a search engine to search terms related to the requested content to determine the new identifier for the resource. However, using a search engine is not guaranteed to find the new identifier for the web site. For example, the content on the web page may change frequently, and search queries using terms related to the old content may not retrieve the page containing new content. Additionally, a search engine may find a large number of web pages that are responsive to the terms in the search query. Finding the requested content from the retrieved web pages may be difficult for the user.

Thus, unless the user is aware of the redirected identifier for the resource, she may no longer be able to reach the resource.

A user may request a web page using an identifier in a number of ways. For example, the user may input the identifier into a web browser address bar to retrieve the resource. Further, the user may select a hyperlink on another web page to retrieve the resource. Additionally, the user may have one or more bookmarks stored in her web browser or accessed via a network that she may select to retrieve a resource.

In all three situations, if an identifier changes for the web page, the user may be presented with an error message or error code for the resource instead of the resource itself.

Various search engines crawl the web on a periodic basis to identify new and updated content on web pages. The search engines index this content so that users may enter search queries to discover content. As a search engine crawls available content, the search engine may receive indications of redirected identifiers for web pages. The search engine may perform further crawling at web pages located at redirected identifiers, and ignore the original identifier. In one embodiment, a redirect system 109 associated with the search engine may collect these redirected identifiers and associate them with the original identifier for the web page.

The Hypertext Transfer Protocol (HTTP) defines various status codes and data elements that are transmitted in response to a request for content or a resource. For example, the 404 status code indicates that a resource could not be found at the identifier used to retrieve the resource. The 301 status code indicates that a resource has been permanently moved to a new identifier, and provides the new identifier for the resource. The 302 status code indicates that a resource has temporarily moved to a new identifier, and provides the new identifier for the resource. The 303 status code indicates that a requestor should make a second request for the resource using a different identifier. Various status codes may be used in embodiments as will described further herein.

Figure 2:
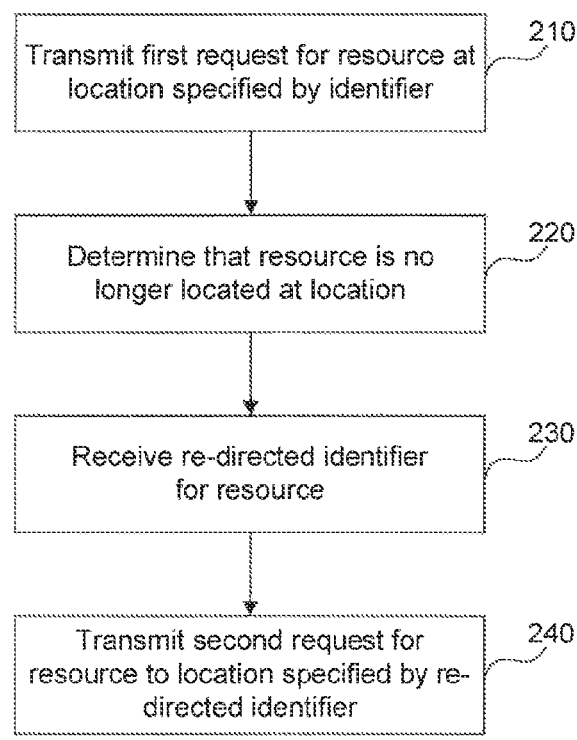
FIG. 2 is a flow diagram of a method in accordance with an embodiment.

FIG. 2 is a flow diagram of a method 200 for accessing a resource, in accordance with one embodiment. Method 200 begins at block 210, where a web browser, such as browser 120, transmits a first request for a resource. The request for the resource may include a location for the resource, specified by an identifier. In an embodiment, the identifier is a Uniform Resource Locator (URL). In another embodiment, the identifier is any combination of letters and numbers specifying a location for a resource. Browser 120 may, for example, request a resource located at web server 105A using an identifier that specifies web server 105A as the location of the resource.

At block 220, a determination is made that the resource is no longer located at the location specified by the identifier included in the request at block 210. In one embodiment, the determination may be based on an HTTP response code transmitted to a web browser. For example, the HTTP response code 404 indicates that no web page is available at the URL specified by a HTTP request. Alternatively, the web browser may make the determination if a certain amount of time has passed since the transmission of the request without a response from a web server, which may be known as the request "timing out".

In response to the determination that the resource is no longer located at the location specified by the original identifier, at block 230, a redirected identifier for the resource may be received. For example, at block 230, browser 120 may receive an identification that the desired resource is located at an identifier for web server 105B. In one embodiment, redirect module 122 of browser 120 may transmit a redirect identifier request, for example, to redirect system 109 or redirect database 103, and receive a redirected identifier in response. In another embodiment, redirect module 122 of browser 120 may maintain its own database of redirected identifiers.

At block 240, a second request for the resource is transmitted to a location specified by the redirected identifier. For example, browser 120 may transmit a request to web browser 105B for the desired resource. In an embodiment, browser 120 automatically transmits a second request for the resource to the location specified by the redirected identifier. In another embodiment, browser 120 provides an option to the user asking whether the user wishes to retrieve the resource from the redirected identifier. The user may choose an option to always retrieve resources from redirected identifiers when a resource is not found at an original identifier.

Receiving redirected identifiers as described herein may improve a user's experience. As described above, if a user does not know of a redirected identifier for a resource, she may be unable to access the desired content. In some embodiments, resources located at redirected identifiers are provided with minimal user involvement. As described above, a user may specify an option to always retrieve resources from redirected identifiers when available. If the user selects this option, her experience may not be significantly different than if the original identifier were still valid, as the browser may automatically retrieve the resource from the location specified by the redirected identifier.

If the user does not select such an option, she may still be able to view the resource located at the redirected identifier with minimal added effort. For example, if a redirected identifier for the resource exists, the user may simply need to affirmatively select an option to retrieve the resource from the location specified by the redirected identifier. The user may not need to use a search engine to find a redirected identifier for the resource, or may not need to retrieve a cached version of the resource to find a redirected identifier.

In an embodiment, if a redirected identifier for the resource cannot be found, a web browser may provide an option to the user to retrieve a cached version of the resource. For example, a web browser may communicate with a search system to retrieve a cached version of the resource. Upon viewing the cached version, the user may be able to determine a redirected identifier for the resource. The redirected identifier may then be used to retrieve the resource, and may be used for the redirect database in an embodiment.

Figure 3:
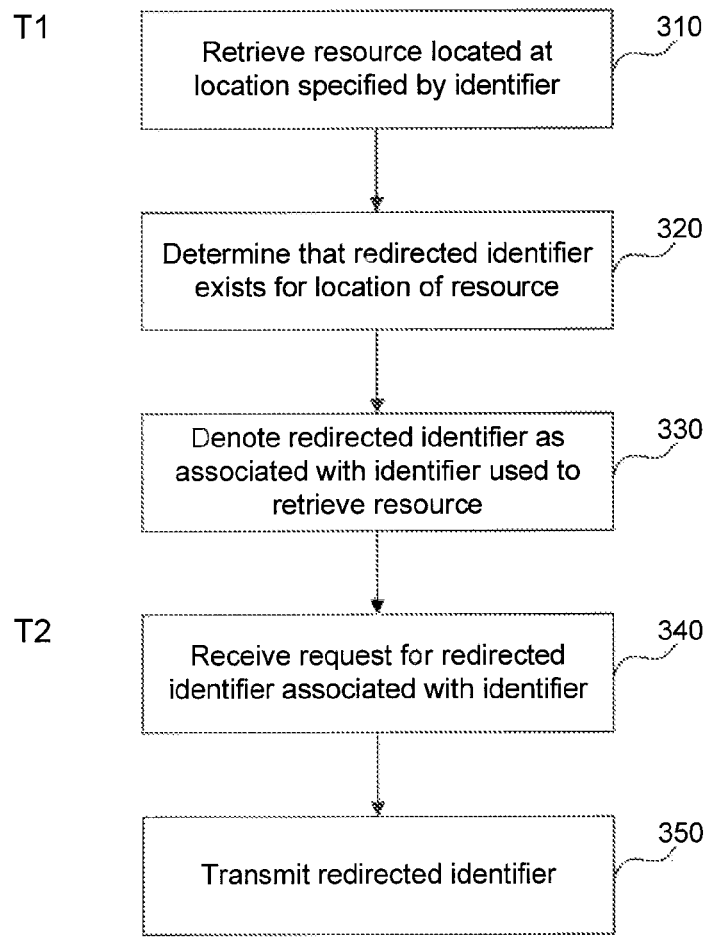
FIG. 3 is a flow diagram of a further method in accordance with an embodiment.

A redirect database may be populated with redirected identifiers and associated original identifiers by a redirect system. In an embodiment, redirect system 109 is part of a search system. FIG. 3 is a flow diagram of a method 300 for determining a redirected identifier for a redirect database, in accordance with an embodiment. Method 300 begins at block 310 at a time T1, where a system, such as redirect system 109, retrieves a resource. The location of the resource may be specified by an identifier such as a URL.

At block 320, a determination is made that a redirected identifier exists for the location of the resource. This determination may be made in a number of ways. In one embodiment, in response to the retrieving a resource at block 310, a redirect system may receive an HTTP 301 status code from the web server, which may include a new identifier for the requested resource.

In another embodiment, upon retrieving the resource from the identifier, the content of the resource may be parsed or analyzed to determine that the resource either has moved to a new identifier or will move to a new identifier. For example, certain web pages contain text stating "This page has moved to [new identifier]. Please update your bookmarks." Similar text may appear if the web page has already changed identifiers. A redirect system 109 may be configured to recognize such content to determine that a redirected identifier exists for a resource, for example, using regular expressions, heuristics, machine learning, or other techniques. As such techniques are refined, the redirect system 109 may be able to identify a greater number of redirected identifiers.

In another embodiment, a provider of a redirect system, or search system associated with a redirect system, may specify a tag or other element of data which specifies that a redirected identifier exists for a resource. For example, the provider of redirect system 109 may specify a string to be included in a META tag of an HTML document. The string can specify that the resource has a redirected identifier that may be used in the future to retrieve the resource.

In response to the determination at block 320, at block 330, the redirected identifier is denoted, in a redirect database, as associated with the identifier used to retrieve the resource. Depending on the implementation of redirect database 103, this may be accomplished using a linked list, an array, a database row, or other appropriate data structure.

At block 340, at a time T2, a request for the redirect identifier associated with the identifier is received. For example, in accordance with block 230 of FIG. 2, a web browser 120 may transmit a request for a redirected identifier for a resource, which may be received at the redirect system 109 in accordance with block 340.

At block 350, the redirected identifier is transmitted. For example, redirect system 109 may search redirect database 103 for a redirected identifier associated with the original identifier transmitted by browser 120, and transmit the redirected identifier to browser 120 over network 101.

In an embodiment, a redirect system periodically deletes redirected identifiers associated with original identifiers stored in a redirect database. For example, if a redirected identifier is not requested for a certain period of time, that redirected identifier may be deleted to save space in redirect database 103.

In an embodiment, multiple redirected identifiers for a resource may exist. For example, a resource may change identifiers multiple times. Each time the resource changes identifiers, a redirected identifier may be associated with the original identifier for the resource. A web browser may provide an option to the user to retrieve the resource from a selection of redirected identifiers.

As described above, users may retrieve resources using bookmarks stored either by a web browser, or on the Internet. In an embodiment, upon retrieving a resource from a redirected identifier, a web browser updates and associates the bookmark with the redirected identifier so that future requests for the resource are transmitted to the correct location. In another embodiment, a web browser asks the user whether she wishes to update her bookmark to be associated with the redirected identifier.

In an embodiment, an original identifier and associated redirected identifier are stored by a web browser, for example, by redirect module 122. For example, a user may request a web page using an original identifier. The web page may indicate to the user that a redirected identifier exists for the web page. A browser 120 or redirect module 122 may store the redirected identifier. On a subsequent request, the user may request the web page using the original identifier, and the browser may receive an HTTP 404 response code and determine that the resource is no longer located at the original identifier. The browser may then use the stored redirected identifier to retrieve the resource.

In an embodiment, a browser 120, or a redirect module 122, transmits stored original identifiers and associated redirected identifiers to a redirect database, such as redirect database 103, such that these redirected identifiers may be used by other users. The browser 120 or redirect module 122 may be configured to only transmit such information if the user of client 110 permits the transmission. In another embodiment, the browser periodically downloads and receives data from redirect database 103 and maintains its own set of redirected identifiers.

In an embodiment, redirect module 122 is implemented as part of a web browser toolbar or extension that modifies browser 120. Such toolbars or extensions may be downloaded and installed by client 110 to extend the functionality of browser 120.

Figure 4A:
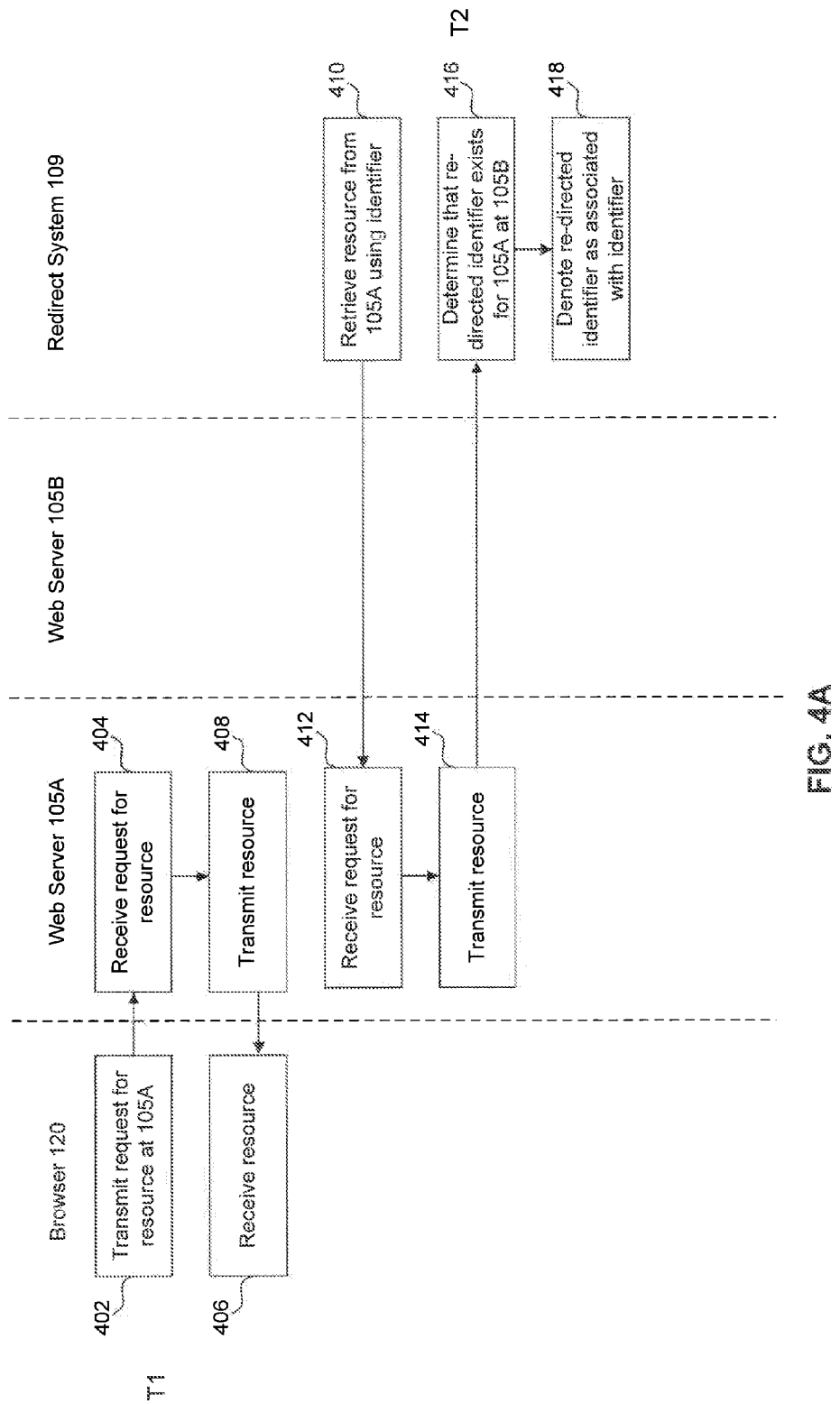
FIGS. 4A and 4B are swim lane diagrams illustrating an example of redirecting broken links, in accordance with an embodiment.
Figure 4B:
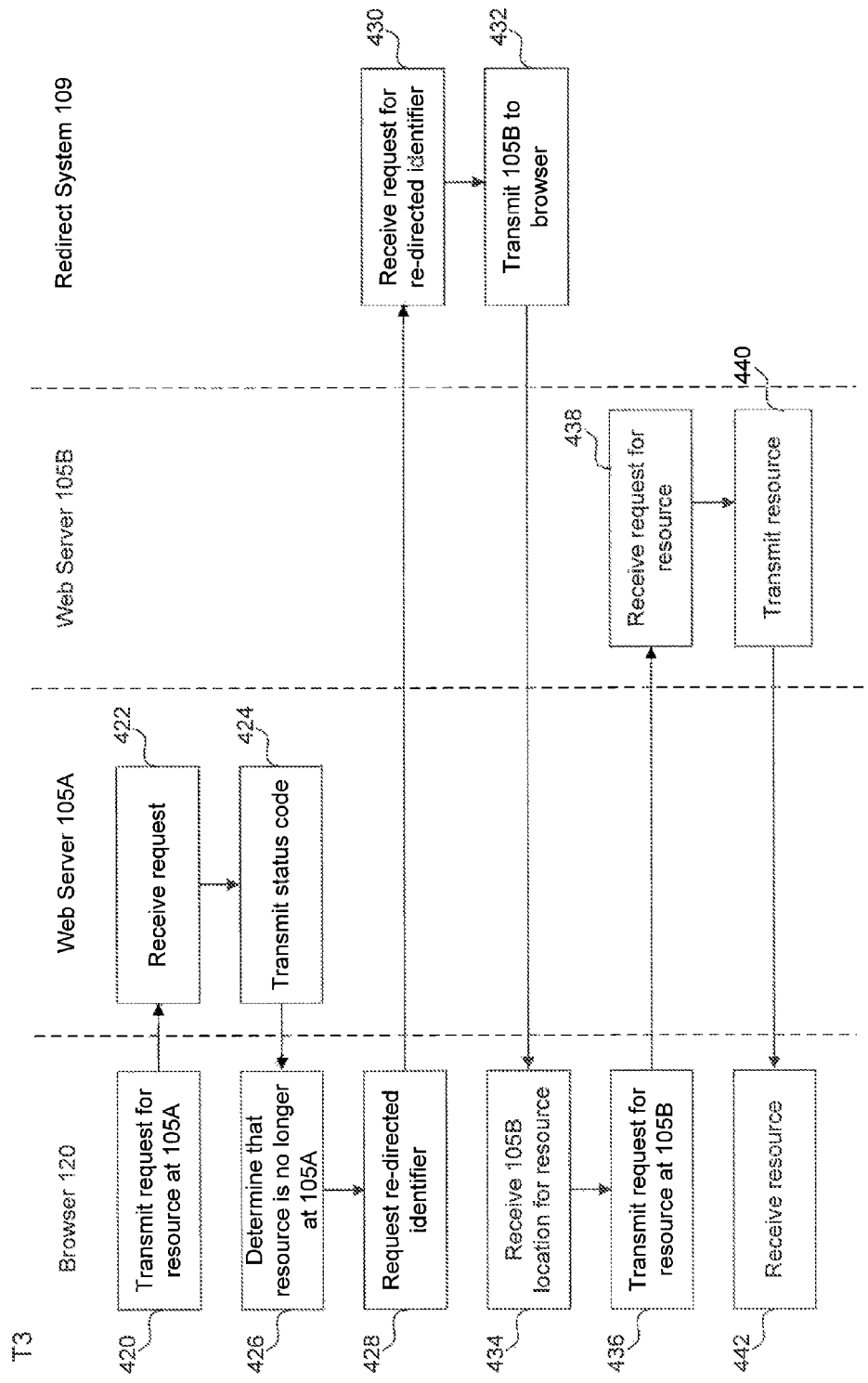

FIGS. 4A and 4B are swim lane diagrams illustrating an exemplary timeline of events in accordance with embodiments. At time T1, a user requests a resource using, for example, a bookmark in her browser. Thus, at box 402, browser 120 transmits a request for the resource located at web server 105A to web server 105A. At box 404, web server 105A receives the request for the resource, and transmits the resource to the browser at box 408. At box 406, the user's browser 120 receives the resource and displays it to the user.

At a time T2, which may be after time T1, redirect system 109 attempts to retrieve a resource from web server 105A using an identifier for the resource, and transmits a request to web server 105A at box 410. In response, web server 105A receives the request for the resource in box 412, and transmits the resource to redirect system 109 in box 414.

In box 416, redirect system 109 determines that a redirected identifier exists for the resource. For example, as described above, redirect system 109 may use an HTTP response code transmitted with a resource to determine that a redirected identifier exists for the resource. Redirect system 109 may also parse the content of the resource to determine that a redirected identifier exists.

Thus, at box 418, redirect system 109 denotes that the redirected identifier is associated with the original identifier used to retrieve the resource in redirect database 103.

Turning to FIG. 4B, at time T3, which is after time T2 and T1, browser 120 transmits a second request for the resource using an identifier for web server 105A. Web server 105A receives the request at box 422, and at box 424, upon determining that the resource is no longer located at web server 105A, transmits a 404 status code to browser 120 at box 424. At box 426, in response to the 404 status code, browser 120 determines that the resource is no longer located at web server 105A.

In response, at box 428, browser 120 requests a redirected identifier for the resource. Browser 120 may do this by transmitting a request for a redirected identifier to redirect system 109, which is received by redirect system 109 at box 430. Redirect system 109 may look up the identifier specified by web browser 120 in redirect database 103, and determine that a redirected identifier exists for the identifier. Thus, redirect system 109 transmits the redirected identifier, specifying web server 105B as the location of the resource, to web browser 120, at box 432.

At box 434, web browser 120 receives the new location for the resource. Thus, at box 436, web browser 120 requests the resource from web server 105B, using the redirected identifier. Web server 105B receives the request at box 438 and transmits the resource to browser 120 at box 440. Web browser 120 receives the resource and displays it to a user at box 442.

Figure 5:
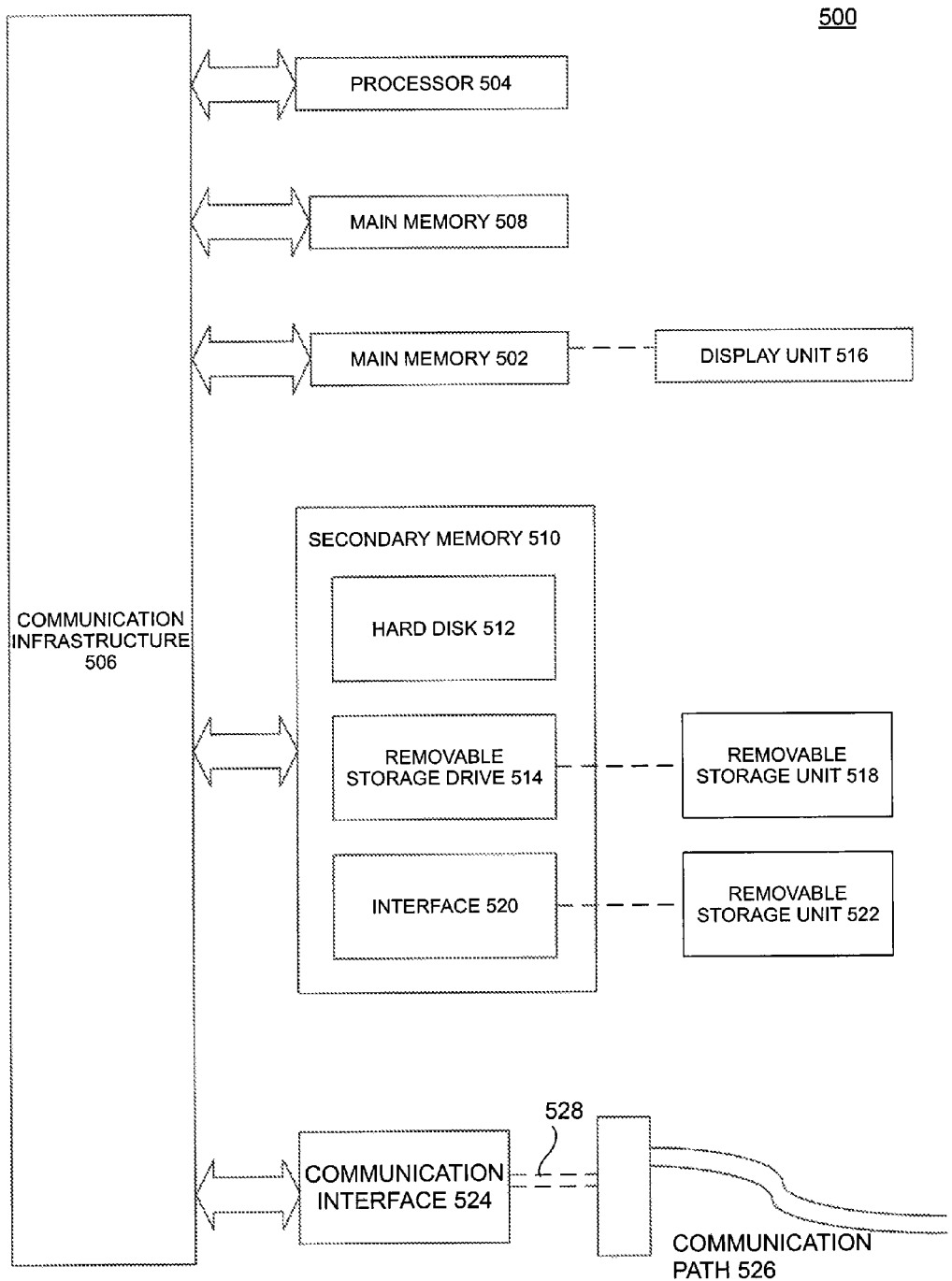
FIG. 5 is a system diagram that can be used to implement embodiments described herein.

FIG. 5 illustrates an example computer system 500 in which embodiments of the present invention, or portions thereof, may be implemented. For example, client 110, web server 105, or redirect system 109 may be implemented in computer system 500 using hardware, software, firmware, tangible computer readable media having instructions stored thereon, or a combination thereof and may be implemented in one or more computer systems or other processing systems.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement embodiments using other computer systems and/or computer architectures. Although operations may be described as a sequential process, some of the operations may in fact be performed in parallel, concurrently, and/ or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer-readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer-readable medium" are used to generally refer to media such as removable storage unit 518, removable storage unit 522, and a hard disk installed in hard disk drive 512. Computer program medium and computer-readable medium may also refer to memories, such as main memory 508 and secondary memory 510, which may be memory semiconductors (e.g. DRAMs, etc.).

Embodiments of the invention also may be directed to computer program products comprising software stored on any computer-readable medium. Such software, when executed in one or more data processing device, causes a data processing device(s) to operate as described herein. Embodiments of the invention employ any computer useable or readable medium. Examples of tangible computer-readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method, comprising:
   transmitting, by a web browser implemented on a processing device, a first request for a web page to a web server, wherein the location of the web page is specified by a Uniform Resource Locator (URL) included in the request;
   receiving, by the web browser, an HTTP 404 status code in response to the transmitted request;
   determining, by the web browser and in response to the received HTTP 404 status code, that the web page is no longer located at the location specified by the URL;
   transmitting, to a database, a request for a redirected URL for the web page, wherein the database is separate from the web server;
   receiving, from the database, the redirected URL for the web page; and
   transmitting, by the web browser, a second request for the web page to a location specified by the redirected URL.

2. The method of claim 1, further comprising providing, to a user, an option to transmit the second request for the web page.

3. The method of claim 1, wherein the database is maintained by the web browser.

4. The method of claim 1, wherein the database is maintained by a remotely located redirect system.

5. The method of claim 1, further comprising:
   transmitting, by the web browser, a third request to a search system to retrieve a cached version of the web page when the web page is not available at the location specified by the redirected URL.

6. The method of claim 1, wherein the first request for the web page comprises a bookmark associated with the URL.

7. The method of claim 6, further comprising associating the bookmark with the redirected URL.

8. The method of claim 1, further comprising: generating the redirected URL from a response of a web server.

9. The method of claim 8, wherein the response of the web server includes one of an HTTP 301 status code, an HTTP 302 status code, and an HTTP 303 status code.

10. The method of claim 1, wherein:
    at least two redirected URLs are received from the database; and
    the second request for the web page is to a location specified by the redirected URL selected by a user.

11. A system, comprising:
    a processor; and
    a web browser, implemented on the processor, configured to:
      transmit a first request for a web page to a web server, wherein the location of the web page is specified by a Uniform Resource Locator (URL) included in the request,
      receive an HTTP 404 status code in response to the transmitted request,
      determine, in response to the received HTTP 404 status code, that the web page is no longer located at the location specified by the (URL),
      transmit, to a database, a request for a redirected URL for the webpage wherein the database is separate from the web server,
      receive, from the database, the redirected URL for the web page, and
      transmit a second request for the web page to a location specified by the redirected URL.

12. The system of claim 11, wherein the web browser is further configured to provide, to a user, an option to transmit the second request for the web page at the redirected URL.

13. The system of claim 11, wherein the first request for the web page comprises a bookmark associated with the URL.

14. The system of claim 13, wherein the web browser is further configured to associate the bookmark with the redirected URL.

15. A computer readable storage memory having instructions stored thereon that, when executed by a processor, cause the processor to perform operations including:
    transmitting a first request for a web page to a web server, wherein the location of the web page is specified by a Uniform Resource Locator (URL) included in the request;
    receiving an HTTP 404 status code in response to the transmitted request;
    determining in response to the received HTTP 404 status code that the web page is no longer located at the location specified by the URL;
    transmitting, to a database, a request for a redirected URL for the webpage, wherein the database is separate from the web server;
    receiving, from the database, the redirected URL for the web page; and
    transmitting a second request for the web page to a location specified by the redirected URL.

16. The computer readable storage memory of claim 15, the operations further comprising providing, to a user, an option to retrieve the web page at the redirected URL.

17. The computer readable storage memory of claim 15, wherein the request the web page comprises a bookmark associated with the URL.

* * * * *